Jan. 17, 1956 C. E. BECK 2,731,555
RADIO SET HOUSING AND MOUNTING
Filed Oct. 5, 1950 2 Sheets-Sheet 1
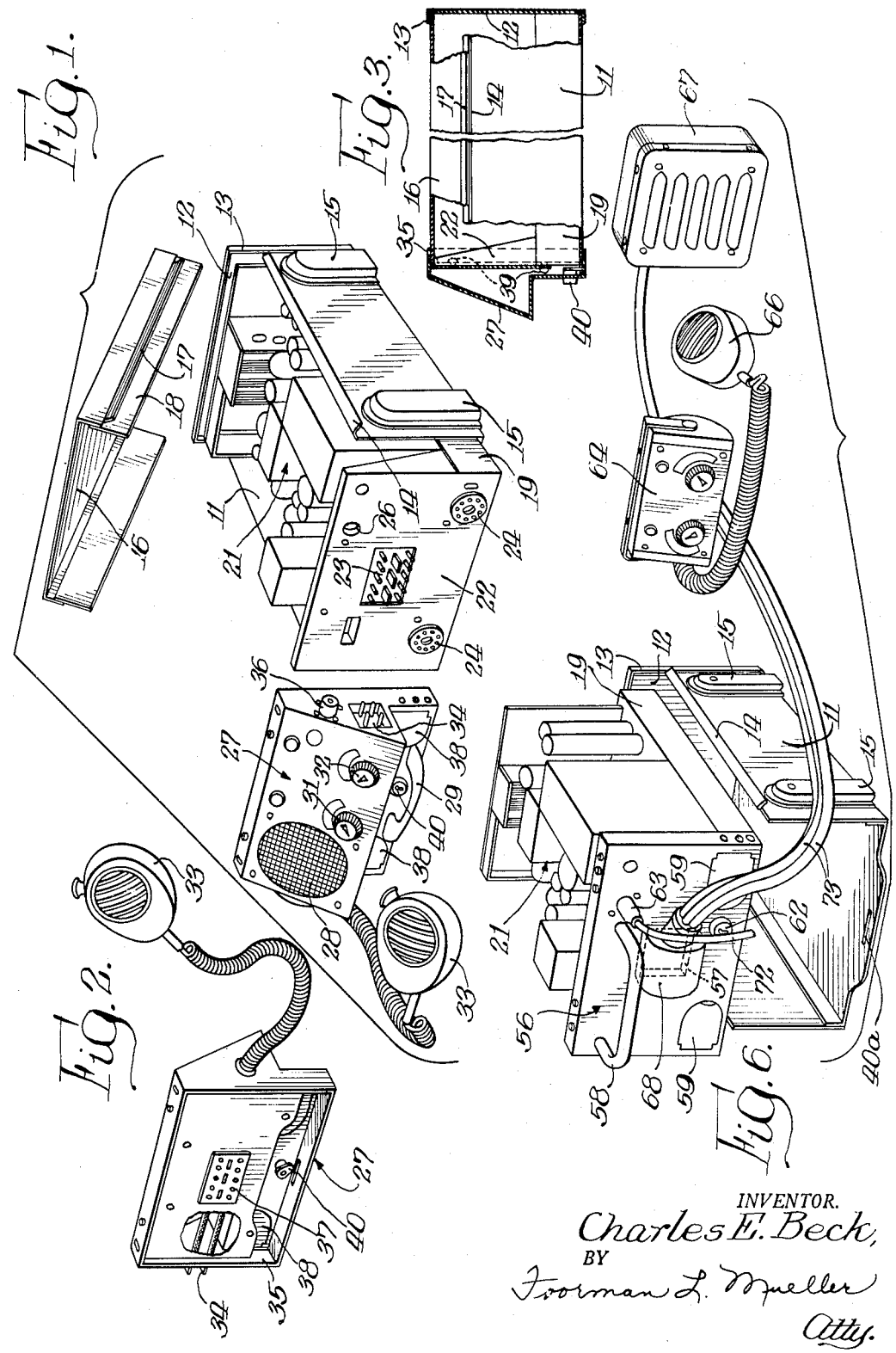
INVENTOR.
Charles E. Beck,
BY
Foorman L. Mueller
Atty.

Jan. 17, 1956 C. E. BECK 2,731,555
RADIO SET HOUSING AND MOUNTING
Filed Oct. 5, 1950 2 Sheets-Sheet 2
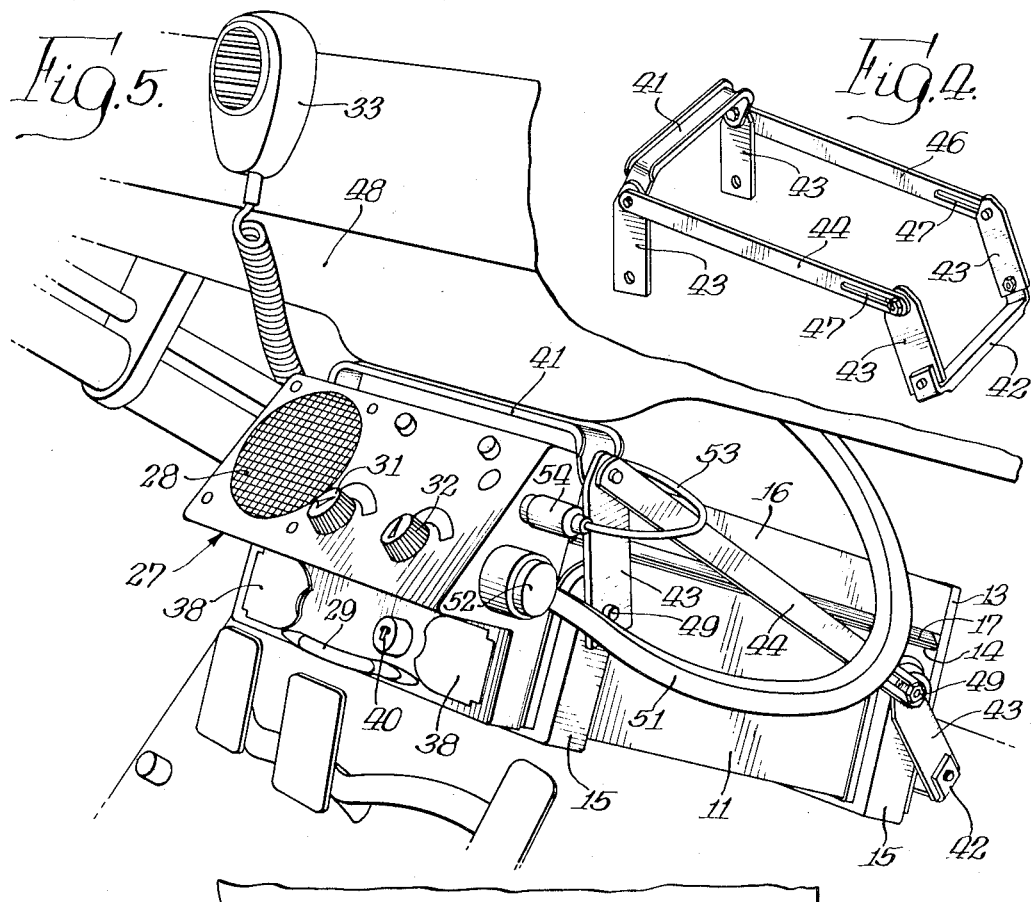
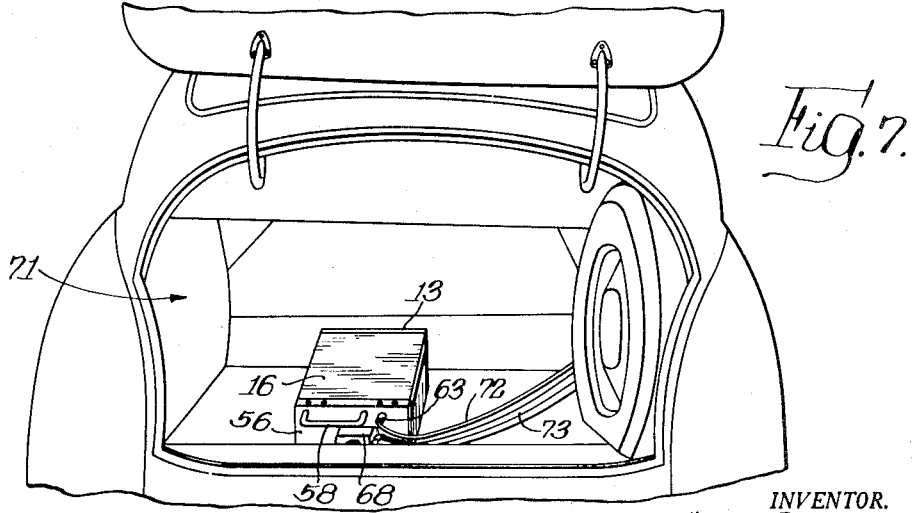
INVENTOR.
Charles E. Beck,
BY
Foorman L. Mueller
Atty.

United States Patent Office 2,731,555
Patented Jan. 17, 1956

2,731,555
RADIO SET HOUSING AND MOUNTING

Charles E. Beck, Park Ridge, Ill., assignor to Motorola, Inc., Chicago, Ill., a corporation of Illinois Application October 5, 1950, Serial No. 188,639

7 Claims. (Cl. 250—16)

The present invention relates generally to radio communication units and more particularly to such units having improved housing and mounting provisions.

There is a large demand for compact two-way communication units in applications in which the units must be installed in automobiles or other mobile vehicles, such as for use by police and fire departments. It is desirable that such units be adaptable for installation on the vehicles in different positions such as under the dash, and in the trunk. To meet this requirement universal mounting facilities are required and also the housing must be of such construction to facilitate test of the unit when installed and permit easy removal of the chassis thereof for servicing. As in most applications it is very important that the equipment provide communication at all times, servicing of the sets is of prime importance. Further, when the unit is mounted under the dash the controls for the unit and the loudspeaker thereof may be provided directly at the unit whereas for trunk mounting it is necessary to provide the controls and speakers remote from the unit. To eliminate the need for two separate units which greatly increases the cost of manufacture and handling, it is desirable that the same unit be adaptable for use either for mounting under the dash of a vehicle to be directly controlled, or for mounting remote from the operator to be remotely controlled.

It is therefore one object of the invention to provide a communication unit having a novel housing which facilitates installation of the unit, and simplifies its maintenance.

Another object of the invention is to provide a communication unit which can be easily and cheaply adapted for use in different types of installation.

A feature of the invention is the provision of a novel three-piece housing that can be readily disassembled to allow the communication unit chassis contained therein to be either liftably or slidably removed.

Another feature of the invention is the provision of a communication unit having plug-in connectors and test metering outlets that are easily accessible from the exterior of the unit.

A further feature of the invention is the provision of a three-piece housing having two different types of end or front panels by means of which the housing can be adapted for mounting a communication unit under the dashboard of a vehicle with the controls directly on the unit, or, if desired, can adapt the housing for mounting the unit in an obscure place, such as the trunk of a vehicle, for operation by remote controls.

Other objects, features and attendant advantages of this invention will be appreciated more readily as the same becomes understood by reference to the following detailed description taken in connection with the accompanying drawings, wherein:

Fig. 1 is a perspective view of a disassembled communication unit constructed in accordance with the invention;

Fig. 2 is a back view of the end or front piece of the housing shown in Fig. 1;

Fig. 3 shows the manner in which the housing is held in assembled relation;

Fig. 4 is a perspective view of a mounting bracket used on the housing shown in Fig. 1;

Fig. 5 is a perspective view of a communication unit constructed in accordance with the invention, and showing its use with one type of installation;

Fig. 6 is a perspective view of the communications unit arranged for remote mounting, shown in disassembled form; and Fig. 7 is a perspective view of the unit of Fig. 6 showing its use in a remote controlled installation.

In practicing the invention, a communication unit is provided which is mounted in a housing including a box-shaped base member having an open top, and an open end. A movable top is provided for the base member, and a chassis containing electronic communication equipment may be seated on the base member. The chassis has an end portion which supports plug-in connectors electrically connected to the communication equipment, and adapted to fit mating parts mounted on external energy supplying conductors. A removable end or a front piece is provided on said end portion of said chassis and serves to cover the open end of the base member, and to hold the base member and the top in assembled relation. In one particular embodiment of the invention, the front piece contains the controlling devices of the communication equipment as well as a loudspeaker and microphone, and has plug-in connectors mounted thereon and adapted to coact with the plug-in connectors on the chassis. In another embodiment, the front piece has an aperture therein which provides access to the plug-in connector on the chassis for adaptor connectors. In both embodiments, the front piece and the chassis may be slidably removed from the open end of the base member, or may be slid out enough for removal of the top so that the chassis may be liftably removed from the open top of the base member.

Referring now to Fig. 1 of the drawings, the communication unit comprising the invention has a housing including a box-shaped member 11 of sheet metal construction having its top, and one of its ends, open. The other end of member 11 is closed by wall 12 which has an inwardly projecting peripheral edge 13 by means of which the wall is secured to the remainder of the member 11. Formed along the top of each of the sides of member 11 is a downwardly extending lip 14 which terminates at points spaced from the ends of each of the sides in order to allow wall 12 and an end member for closing the open end of the box-shape structure, to fit snugly against the side of member 11. The sides and walls of member 11 are reinforced by a plurality of elongated, cup-shaped supports 15 each of which is bent to form an L, and has one of the legs thereof secured to the bottom of member 11, and the remaining leg thereof secured to the side of said member. The open top of the box-shape base member is adapted to be closed by a removable top 16 of sheet metal construction that has the sides thereof turned downwardly at right angles to its main surface. Integral with each of the downwardly turned sides is an outwardly flaring lip 17 which, together with a strip 18 welded to the inside surface of the sides, forms a seat that is adapted to coact with downwardly turned lip 14 on member 11 to support top 16 on the box-shape base member. Lip 17 terminates at a point remote from each of the ends of top 16 so as to allow one end of the top to slide under the inwardly projecting edge 13 of a portion of wall 12 that rises above the top edge of member 11, and to allow a removable end member to be snugly fitted over the otherwise open end of the box-shaped structure.

Slidably seated in base member 11 in a drawer-like fashion, is a chassis 19 mounting an electronic signalling unit comprising a transmitter-receiver, indicated at 21. Chassis 19 has an end portion 22 which is adapted to close the open end of base member 11 when the chassis is positioned on the base member 11. Chassis 19 supports a plurality of plug-in connector means shown at 23 and 24, in end portion 22 which has an aperture 26 therein for accommodating a signal supply conductor going to the transmitter-receiver unit 21. Plug-in connector means 23 may comprise a Jones plug, or the like, and is electrically connected to the transmitter-receiver unit 21 for supplying energy thereto and making signalling connections therewith. Plug-in connector means 24 comprise standard metering sockets to allow test measurement at different points in the circuit of the transmitter-receiver unit 21.

To hold the above described structure in assembled relation, a removable end member adapted to fit over the open end of said base member, is provided. In one embodiment of the invention, the end member comprises a downwardly sloped control panel 27 having a decorative grill 28 for accommodating a loud speaker, and a handle 29 by means of which the end member can be removed from its assembled position with respect to the housing. End member or control panel 27 also includes control devices 31 and 32 comprising a variable squelch circuit control, and volume control, respectively, a microphone 33 connected to the control panel through a flexible cable, and connector means including portions of a power supply, four prong plug-in connector device 34 and a socket 36 for receiving a coaxial cable signal supply conducting for the transmitter-receiver unit. As is best shown in Fig. 2, panel 27 includes plug-in connector means 37 adapted to cooperate with the plug-in connector means 23 of chassis 19 to connect the above recited elements into the circuit mounted on chassis 19, as well as to energize the circuit. Power supply connector device 34, control devices 31 and 32, the loudspeaker situated behind grills 28, and microphone 33 are adapted to be electrically connected through plug-in connector portions 23 to their respective places in the unit being assembled within the housing. Socket 36 is connected by a coaxial conductor accommodated by aperture 26 to the signal input or output circuits of the transmitter-receiver unit 21, and access to the metering socket 24 is provided by a pair of hinged doors 38 mounted on the front of end member or panel 27. In order to assemble the unit for use, the plug-in connectors on the end member 27 and on the chassis 19 are aligned and the two thrust together. The end member or panel 27 is then secured to end member 22 of chassis 19 by means of a plurality of machine screws indicated at 39 (Fig. 3).

To position the chassis in the housing and assemble the same, the chassis 19 is dropped into the box-shaped member 11 being placed therein either through the open top or from the open end. The chassis must remain out at the open end of the box-shaped member for a small distance as will be apparent. The top 16 may then be placed on the box-shaped member 11 with the outwardly flared lip 17 placed on the downwardly turned lip 14 of the member 11. The back of the top 16 is slid under the projecting edge 13 of the rear wall 12 to be held in position thereby. The chassis and end member may then be slid inwardly so that the edge 35, which extends all about the end member 27, surrounds the top member 16 and the box-like member 11 to hold these two members in assembled relation. This structure is clearly shown in Fig. 3 wherein the top member 16 is shown held in place by the edge 13 on the rear wall 12 of the box-like member and by the edge 35 of the end member 27. The end member may be held in place with respect to the box-like member by a locking arrangement including a key controlled tumbler 40 which cooperates with a slot 40a in the box-like member 11 (Figs. 3 and 6).

In order to mount the housing thus assembled in various available places, a mounting bracket is provided. Referring to Fig. 4 of the drawings, the mounting bracket includes a pair of U-shaped members 41, 42 having an extension arm 43 pivotally supported to the end of each of the leg portions thereof. Interconnecting each of the U-shaped members 41, 42 and their respective extension arms 43, are a pair of adjustable connecting arms 44 and 46 each having a circular aperture in one of its ends, by means of which they are pivotally secured to the junction of the legs of member 41 and their extension arms 43, and having an elongated aperture 47 in their remaining end by means of which the connecting arm is adjustably secured to a respective extension arm 43 of member 42. In order to give the bracket the required structural strength, the above recited element is constructed of U-shaped channel sheet metal, and to provide a means for supporting the housing, apertures 47 are formed in the end of each of the connecting arms 44, 46.

Referring now to Fig. 5, a typical installation of the above described communication unit, is shown. The installation is made under the dashboard 48 of an automobile to which the housing comprising base member 11, top 16 and end member 27 is pivotally mounted by a plurality of bolts 49 secured to the ends of the extension arms 43 of the mounting bracket. U-shaped member 41 is secured to the under portion of dashboard 48, and U-shaped member 42 is secured to the foot board of the vehicle. Power is supplied to the communication unit within the housing by means of a pair of conductors 51 and a connector device 52 adapted to coact with the connector device 34 on the control member or end member 27, and input signals to and from an antenna are supplied through a conductor 53 and a coaxial cable joint 54 adapted to cooperate with the socket 36 on the end member. By reason of the invention both the installation and subsequent servicing of the communication unit in the rather inaccessible space under the dashboard of the vehicle is easily accomplished. U-shaped members 41 and 42 are easily attached to the under portion of the dashboard and to the foot board, and positioning of the housing to provide maximum leg room is made possible by reason of the adjustment provided by connecting arm 44 and 46. Having completed the mounting of the communication unit under the dashboard, wiring is easily accomplished by plugging connector 54 into socket 36, and connector portion 52 into connector portion 34. The unit is then conditioned for operation. Should failure of the unit occur thereafter, it can be serviced in the following manner. Nut 49 holding connecting arms 44 and 46 and extension arms 43 is loosened sufficiently to allow the closed end of base member 11 to be pivoted upwardly, and to rotate the open end closed by panel 27 downward sufficiently so that the panel can clear the lower edge of the dashboard. Connectors 52 and 54 are then removed from their position on end member 27, and lock 40 unlocked. By pulling handle 29, the entire chassis can be then withdrawn from the housing 11, 16 in a drawer-like fashion; thereby making the components of the transmitter-receiver unit readily accessible for servicing.

Referring now to Fig. 6 of the drawings, a second embodiment of an end member for use with the housing comprising base member 11 and top 16, is shown. The second end member 56 has a centrally disposed, rectangular-shaped aperture 57 formed therein, a handle 58, a pair of hinged doors 59 closing apertures for providing access to the metering socket 24 on chassis 19, a lock indicated by keyhole 62, and a connector portion 63 for receiving a signal supply conductor. When using panel 56, certain auxiliary items are required and include a control head 64 and microphone 66, a loudspeaker 67, and an adapter connector means 68 which is accommodated by the aperture 57 and coacts with the connector portions 23 on chassis 19. In assembling the unit with an end member such as that shown at 56, the end member is secured to chassis 19 and then the chassis and end member are placed on the base member 11 and the top member 16 is placed on top. The chassis and end member must be slid out somewhat while the top is positioned and then slid inward so that the edge of the end member engages the top 16 and base member 11 and cooperates with the inwardly projecting edge 13 to retain the entire housing in assembled relation.

The end member 56 is used to complete the communication unit housing when the unit is to be mounted for remote control as in the trunk of an automobile, as is shown in Fig. 7 of the drawings. Input signals are supplied to the unit through a conductor 72 connected to connector portion 63, and energizing power as well as input and output audio signals are supplied through a plurality of the conductors 73 and adapter connector means 68 which is plugged into the connector portion 23 on chassis 19 through aperture 57 in the end member 56. In Fig. 7, it is seen that the unit is positioned in a deep well situated in the trunk 71 of an automobile. When mounted in this manner, it can be appreciated that there is little room for sliding a chassis 19 out from within the housing in a drawer-like fashion in the manner described with relation to the type of mounting shown in Fig. 5. However, the removable top 16 allows the chassis member to be lifted vertically from its position within the housing as is shown in Fig. 6. In order to accomplish this, the conductors 72 and 73 are first disconnected by removing connector means 63 and adapter connector means 68. End member 56 is unlocked from its closed position and together with chassis 19 is then slid outward a distance sufficient to release the end of top 16. This allows the top 16 to be lifted free from the inwardly projecting, peripheral edge 13 of closed end 12. Removal of the top 16 then allows the chassis 19 to be lifted upward and out from the well in the trunk, thereby making components of the transmitter-receiver unit accessible for servicing.

From the foregoing description it can be appreciated that installation of the communication unit having a housing constructed in accordance with the invention, is greatly facilitated. In the event that the unit is being mounted in an inaccessible place, such as the under portion of an automobile dashboard, the housing can be mounted with the chassis containing the communication unit itself removed, and this results in reducing the weight to be handled during the mounting operation to a substantially negligible amount. Whether the unit is to be mounted in a place where it can be directly controlled, or in some place where remote control of the unit is provided, the same housing can be used, requiring only a change in the type of end member used on the unit. Thus, it is seen that the major portion of the housing can be produced in large quantity for use in different types of installations. The mounting means for the housing is adjustable so that the unit can be positioned to take up the least amount of available space, and yet be moved to make the unit accessible for servicing. Installation of the unit is further facilitated by the provision of outwardly accessible plug-in connector means that greatly simplify connection of the unit for operation. Because of its three piece construction, the housing can be easily broken down to allow the chassis contained therein to be removed in either one of two different manners. Thus, in the event that the unit is mounted on the under portion of a dashboard, the chassis can be removed from the housing by sliding it out in a drawer-like fashion. In the event that the unit is mounted in a well or the like preventing the withdrawal of the chassis in this fashion, it can be removed by lifting the same upwardly. With either type of mounting installation as well as servicing of the unit is greatly facilitated. Servicing of the unit is further simplified by the provision of the easily accessible metering sockets.

Obviously, other modifications and variations of the invention are possible in the light of the above teaching, and it is therefore to be understood that variations can be made herein which are within the full intended scope of the invention as defined by the appended claims.

I claim:

1. A transmitter-receiver communications unit including a housing comprising a box-shape base member having an open top and an open end, a movable top for said base member, a chassis supported within said base member in a drawer-like fashion, a transmitter-receiver communications unit mounted on said chassis, said chassis including an end portion having an aperture therein for accommodating a signal supply conductor, test sockets electrically connected to various points in the circuit of said transmitter-receiver to render the same readily accessible for meter reading, and plug-in connector means electrically connected to said transmitter-receiver unit and adapted to fit mating parts on external means cooperating with said transmitter-receiver unit to render the same operative, and a removable end structure fittable over the open end of said base member and adapted to retain said base member and said top in assembled relation, said removble end structure including a control panel for the transmitter-receiver unit, connector means adapted to cooperate with said plug-in connector means on said chassis for conditioning said transmitter-receiver unit for operation, loudspeaker means, control devices for controlling the operation of said transmitter-receiver unit, socket means aligned with the aperture in said chassis for receiving a signal supplying conductor, and movable closures cooperating with said test sockets to close the same, said loudspeaker means and said control devices being connectible to said transmitter-receiver unit through said plug-in connector means, said chassis being slidably removable from the open end of said base member and being liftably removable from the open top of said base member.

2. A transmitter-receiver communications unit including a housing comprising a box-shape base member having an open top and an open end, a movable top for said base member, a chassis supported within said base member in a drawer-like fashion, a transmitter-receiver communications unit mounted on said chassis, said chassis including an end portion having an aperture therein for accommodating a signal supply conductor, test sockets electrically connected to various points in the circuit of said transmitter-receiver to render the same readily accessible for meter reading, and plug-in connector means electrically connected to said transmitter-receiver unit and adapted to fit mating parts on external means cooperating with said transmitter-receiver unit to render the same operative, and a removable end member fittable over the open end of said base member and adapted to retain said base member and said top in assembled relation, said removable end member having an aperture formed therein for making said plug-in connector portions accessible when said housing is assembled, socket means in alignment with the aperture in the end portion of said chassis for receiving a signal supplying conductor, and movable closures cooperating with said test sockets to close the same when not in use, said chassis being slidably removable from the open end of said base member and being liftably removable from the open top of said base member.

3. A communications unit including a housing which comprises a base member having a bottom, side walls and a closed end formed as an integral unit, a movable top member for said base member having edges adapted to engage said side walls and said closed end thereof, a removable end member adapted to be positioned at the open end of said housing, an elongated chassis adapted to be supported within said base member in operating position therein, means securing said end member to said chassis at one end thereof, said chassis being slidable within said base member and being removable therefrom through the open end thereof, said closed end of said base member and said removable end member having flange portions in overlapping engagement with said movable top member for holding the same in assembled relation with respect to said base member when said chassis is positioned in said base member, said movable top member being released by said end member when said chassis is slid a small distance through said open end so that said flange on said removable member clears said top member, whereby said top member is movable to a position which permits said chassis to be lifted out of said base member, and latching means on said end member selectively engaging said base member for holding said chassis in operating position in said base member.

4. A communications unit including a housing comprising a box-shape base member having a bottom, side walls and a closed end, and with an open top and an open end, a movable top member adapted to be positioned on said base member to close the open top thereof, said closed end including a portion adapted to receive one end of said movable top member for holding said one end against said base member, a chassis drawer positionable within said base member, electronic signalling equipment mounted on said chassis drawer, said chassis drawer having an end portion supporting connector means electrically connected to said signalling equipment, a removable end member secured to said end portion of said chassis drawer and having a peripheral flange fitting about the open end of said base member and the end of said movable top member opposite to said one end to retain said top member in assembled relation on said base member when said drawer is positioned within said base member, said chassis drawer being slidably removable from the open end of said base member and being slidable to a position such that said flange of said removable end member clears said top member to permit movement of said top member so that said chassis drawer is removable from the open top of said base member.

5. A housing for a communications unit including a box-shaped base member constructed of sheet metal and having a bottom, side walls and a closed end with an open top and an open end, said side walls having lips formed at the top thereof, said closed end having an inwardly projecting peripheral edge, a movable top constructed of sheet metal and having outwardly flaring edges cooperating with said lips on said base member to seat said top, said top having a portion adapted to be positioned under said inwardly projecting peripheral edge, and a removable end member fitted over the open end of said base member and having a peripheral flange overlapping said base member and said movable top, said peripheral edge on said closed end and said peripheral flange of said removable end member engaging the opposite ends of said top to retain said top in assembled relation on said base member when said removable end member is in engagement with said base member, and latch means for holding said removable end member in engagement with said base member, said housing when assembled forming a weathertight closure.

6. A communications unit including a housing including a box-shape base structure having a bottom, side walls and a closed end, and with an open top and an open end, a top structure adapted to be positioned on said base structure to close the open top thereof, said closed end including an inturned portion adapted to receive a portion at one end of said top structure for holding said one end thereof against said base structure, a chassis forming a drawer positionable within said base structure, said chassis having electronic signalling equipment mounted thereon, and an end member for said housing adapted to be secured to an end of said chassis, said end member having a peripheral flange fitting about the open end of said base structure and the end of said top structure opposite to said one end thereof when said chassis is positioned within said base structure, said chassis being slidably removable from the open end of said base structure and being slidable to a position such that said flange of said end member clears said top structure to permit movement of said top structure so that said chassis is removable from the open top of said base structure.

7. A housing for a communications unit including a box-shaped base structure constructed of sheet metal and having a bottom, side walls and a closed end, and with an open top and an open end, said side walls having lips formed at the top thereof, said closed end having an inwardly projecting peripheral edge, a movable top constructed of sheet metal and having downwardly turned edges shaped to cooperate with said lips on said base structure to seat said top on said base structure, said top having a portion adapted to be positioned under said inwardly projecting peripheral edge, and a removable end member adapted to be fitted over the open end of said base structure and having a peripheral flange overlapping said base structure and said movable top, said peripheral edge on said closed end and said peripheral flange of said removable end member being positioned in overlapping relation with portions of said top at opposite ends thereof when said removable end member is fitted over the open end of said base structure, and latch means for holding said removable end member in engagement with said base structure.

References Cited in the file of this patent

UNITED STATES PATENTS

| | | |
|---|---|---|
| 1,656,497 | Paulson | Jan. 17, 1928 |
| 1,898,835 | Henderson | Feb. 21, 1933 |
| 1,968,557 | Johanson | July 31, 1934 |
| 2,175,025 | Hooven | Oct. 3, 1939 |
| 2,330,868 | Chappory | Oct. 5, 1943 |
| 2,337,159 | Friedl | Dec. 21, 1943 |
| 2,457,023 | Zelt | Dec. 21, 1948 |
| 2,472,582 | Green | June 7, 1949 |
| 2,486,764 | Singer | Nov. 1, 1949 |
| 2,514,246 | Knox | July 4, 1950 |
| 2,602,842 | Morris et al. | July 8, 1952 |

FOREIGN PATENTS

| | | |
|---|---|---|
| 914,909 | France | July 1, 1946 |